US010341367B1

(12) United States Patent
Kim

(10) Patent No.: US 10,341,367 B1
(45) Date of Patent: Jul. 2, 2019

(54) SYSTEM AND METHOD FOR INQUIRING IOC INFORMATION BY P2P PROTOCOL

(71) Applicant: Saint Security Inc., Seoul (KR)

(72) Inventor: Kihong Kim, Seoul (KR)

(73) Assignee: Saint Security Inc., Seoul (KR)

( * ) Notice: Subject to any disclaimer, the term of this patent is extended or adjusted under 35 U.S.C. 154(b) by 0 days.

(21) Appl. No.: 15/842,330

(22) Filed: Dec. 14, 2017

(30) Foreign Application Priority Data

Dec. 8, 2017 (KR) .......................... 10-2017-0167993

(51) Int. Cl.
| | | |
|---|---|---|
| *H04L 29/06* | (2006.01) | |
| *G06F 21/57* | (2013.01) | |
| *H04L 29/08* | (2006.01) | |
| *G06F 21/55* | (2013.01) | |

(52) U.S. Cl.
CPC ........ *H04L 63/1416* (2013.01); *G06F 21/552* (2013.01); *G06F 21/554* (2013.01); *G06F 21/577* (2013.01); *H04L 63/1433* (2013.01); *H04L 67/104* (2013.01)

(58) Field of Classification Search
CPC ............. H04L 63/1416; H04L 63/1433; H04L 67/104; G06F 21/552; G06F 21/554; G06F 21/577
See application file for complete search history.

(56) References Cited

U.S. PATENT DOCUMENTS

| 8,695,095 B2* | 4/2014 | Baliga .................. G06F 21/568 709/224 |
| 2010/0223463 A1 | 9/2010 | Sakaguchi et al. |
| 2012/0144030 A1* | 6/2012 | Narasimhan .......... H04L 41/046 709/224 |

(Continued)

FOREIGN PATENT DOCUMENTS

KR 20060070242 A 6/2006

OTHER PUBLICATIONS

Adeel et al., Propagation Analysis of Malware Families in Mobile P2P Networks, Apr. 2014, 11th International Conference on Information Technology: New Generations, pp. 220-226 (Year: 2014).*

(Continued)

*Primary Examiner* — Kenneth W Chang
(74) *Attorney, Agent, or Firm* — Mintz Levin Cohn Ferris Glovsky and Popeo, P.C.; Kongsik Kim; Derek E. Constantine

(57) ABSTRACT

Methods, systems, and devices are provided for inquiring and storing Indicator of Compromise (IoC) information. In one example, a method of inquiring and storing IoC information can include determining a target IoC information to be identified when an event occurs, requesting an encryption socket communication module of a first user terminal to request the target IoC information from an IoC information providing server, requesting a P2P socket communication module of the first user terminal to request the target IoC information from a P2P socket communication module of at least one other user terminal, and storing the target IoC information that is received first from either the IoC information providing server or the P2P socket communication module of the at least one other user terminal.

11 Claims, 5 Drawing Sheets

(56) References Cited

U.S. PATENT DOCUMENTS

| | | | | |
|---|---|---|---|---|
| 2014/0101748 A1* | 4/2014 | Ancona | ............... | G06F 21/566 726/12 |
| 2015/0244678 A1* | 8/2015 | Stevens, IV | ........ | H04L 63/0227 726/23 |
| 2016/0080418 A1* | 3/2016 | Ray | ................. | H04L 63/20 726/1 |
| 2016/0191476 A1* | 6/2016 | Schutz | ................ | H04L 63/06 713/165 |
| 2016/0269434 A1 | 9/2016 | DiValentin et al. | | |
| 2017/0264589 A1 | 9/2017 | Hunt et al. | | |

OTHER PUBLICATIONS

Kim, "A method to indicator compromise utilization for the effective infringement accident analysis", Department of Information Security Graduate School of Information and Communications, Konkuk University (2015) 67 pp.

\* cited by examiner

```
{"black_white":0,"view_count":0,"sha1":"1E3755260B2AF
2BCB71ACE4F23F8017C2270858D","virustotal":{"positives
":33,"total":60,"scan_date":"2017-11-04
07:06:23"},"result_msg":"Data
exists","filetype":"doc","ai_score":100,"version":"20
15072100","filesize":98304,"behavior":{"w7_32_kor":{"
date":"2017-08-02
02:09:26","detection":[{"path":"c:\\windows\\system32
\\windowspowershell\\v1.0\\powershell.exe","pid":2884
,"description":"Create file in user
directory","dflag":2},{"path":"c:\\\\appdata\\local\\
temp\\39081.exe","pid":2536,"description":"Create
file in user
directory","dflag":2},{"path":"c:\\\\appdata\\local\\
temp\\39081.exe","pid":2536,"description":"Program
auto-run
registration","dflag":2},{"path":"c:\\\\appdata\\roam
ing\\guide.exe","pid":2560,"description":"Modify
document
file","dflag":1}],"security_level":1}},"date":"2017-
12-06 13:26:48","first_seen":"2017-08-01
17:06:47","sha256":"0C73433E36B2E4E42B909DFDACE5A67AC
B35C138DA1802481F5ED5BE683271C9","taglist":["with_url
s","ransomware","doc","run-
file","interested_strings_path","macros","autorun","u
ser-
directory","interested_strings_url"],"result_code":1,
"md5":"EF4C80B072ED3A1054FC1B13ABEA1D39"}
```

FIG. 4

```
{"detected_url":{"total":2026,"list":[{"date":"2017-
12-05
04:51:29","url":"http://webhttps.websecexp.com/","tot
al":66,"positives":5},{"date":"2017-12-01
18:21:14","url":"http://allidoiscashouttt.com/","tota
l":66,"positives":4},{"date":"2017-12-01
18:20:49","url":"http://catchashotnigga.com/","total"
:66,"positives":4},{"date":"2017-11-30
04:22:08","url":"http://benjaminbrotherspurchasing.co
m/","total":66,"positives":4},{"date":"2017-11-28
07:20:41","url":"http://ymtz786.com/","total":66,"pos
itives":4},{"date":"2017-11-28
04:57:55","url":"http://songqiantz.com/","total":65,"
positives":4},{"date":"2017-11-28
04:33:35","url":"http://truesecure.club/","total":66,
"positives":4},{"date":"2017-11-26
15:55:09","url":"http://bj3dvw.xyz/","total":65,"posi
tives":5},{"date":"2017-11-26
15:05:11","url":"http://ssfvfaux7uyafgsxigs98ytauxga9
s7xtfgas9x7rfa9sx7rfa9xfva9sxg.womanrose.us/","total"
:65,"positives":6},{"date":"2017-11-24
19:51:37","url":"http://ssfvfaux7uyafgsxigs98ytauxga9
s7xtfgas9x7rfa9sx7rfa9xfva9sxg.womanrose.us:2/","tota
l":66,"positives":5},{"date":"2017-11-22
20:46:35","url":http://chinamansteve.com/",
"total":65,
```

SYSTEM AND METHOD FOR INQUIRING IOC INFORMATION BY P2P PROTOCOL

CROSS REFERENCE TO RELATED APPLICATION

The present application claims priority to Korean Application No. 10-2017-0167993 filed on Dec. 8, 2017, which is incorporated herein by reference.

TECHNICAL FIELD

The present disclosure relates to a method of inquiring and storing Indicator of Compromise (IoC) information, and more specifically, to a method of inquiring IoC information, which reduces data communication traffic as well as response time when the IoC information is inquired.

BACKGROUND ART

As cyber security threat increases in the online space recently, various methods for promptly sharing information on various kinds of security threats have been developed. A method most frequently used among them is sharing Indicator of Compromise (IoC) information by which many security products promptly identify and block the threat.

The IoC information includes information for performing a security function, such as IP information, hostname information, URL information, hash information of a malicious code file, information on Command and Control Server (C&C Server) and the like. Security companies use the IoC information for sharing security threat information or for promptly sharing counteract information to enhance security of companies or public institutions.

In many cases, IoC information generated by a company is transformed to a file of a specific format (XML or JSON) and the file is transferred to another company. The company receiving the file processes the file into a usable information form. In this case, it is general that information generated during a predetermined time period is collected through a batch process and is shared through an FTP server or an e-mail once in the predetermined time. Alternatively, the information is exchanged by a communication protocol mutually agreed among the companies. According to a general IoC information exchange method, the shared IoC information is stored in a server or a cloud storage so that a company receiving the IoC information may re-inquire through a re-inquiry interface, if necessary, the IoC information to the server of the company that has transferred the information.

According to the conventional technique like this, the communication span for exchanging the IoC information, i.e., the distance to the security equipment or the security software which performs the security function, is long; the physical resources increase; and transmitting and receiving the IoC information takes long time.

An on-demand method of inquiring information when needed, other than the batch process, is disadvantageous in that a server or a communication circuit which provides the information is heavily loaded since the information that should be identified is received too much from the security equipment or software for performing the security function.

A communication method of generally inquiring IoC information according to the conventional technique is shown in FIG. 3. In order to inquire to an IoC information providing server 300 and receive IoC information therefrom, a user terminal 250 goes through a connection process including at least three steps of a TCP connection step, an HTTP connection step, and an SSL encryption step of encrypting HTTP data. In the connection process like this, if the amount of data to be inquired increases due to the increasing number of users, i.e., if the number of queries increases, the server resources may not manage the load, and the data inquiry may not be performed smoothly, and therefore, too much cost is required to solve the problem since the server resources should be increased.

It is important to promptly share security threat information to promptly respond to cyber security threats. Further, a great deal of damage may occur if the increasing users and loads are handled inappropriately.

SUMMARY

Therefore, the present disclosure has been made in view of the above problems, and it is an object of the present disclosure to provide a method of inquiring IoC information, which can stably and promptly respond to security threats by removing the disadvantages of the conventional technique described above.

The method of inquiring and storing IoC information of the present disclosure is performed by at least one user terminal in an environment including a plurality of user terminals and an IoC information providing server. The user terminals are respectively provided with an event processing module, an IoC inquiry agent module, an encryption socket communication module and a P2P socket communication module.

The method comprises a first step of determining IoC information to be identification target when an event occurs, which is performed by the event processing module; a second step of requesting the encryption socket communication module and the P2P socket communication module to inquire the IoC information, which is performed by the IoC inquiry agent module; a third step of requesting IoC information to the IoC information providing server, which is performed by the encryption socket communication module; a fourth step of requesting IoC information to a P2P socket communication module of the other user terminal, which is performed by the P2P socket communication module; and a fifth step of storing IoC information receiving first among the IoC information requested at the third and fourth steps.

In a preferred embodiment of the present disclosure, at the fifth step, the IoC information is stored in a cache memory of the user terminal during a predetermined time period. Further, the method further may comprise, before the second step, a 2-1 step of inquiring the IoC information stored in the cache memory of the user terminal, which is performed by the IoC inquiry agent module. If it is determined at the 2-1 step that the IoC information stored in the cache memory is not effective, the second step is performed.

In a preferred embodiment of the present disclosure, the plurality of user terminals belong to a local internal network, and the fourth step is a step of requesting IoC information to a P2P socket communication module of the other user terminal through UDP broadcasting, which is performed by the P2P socket communication module of the user terminal.

In a preferred embodiment of the present disclosure, the plurality of user terminals belong to a local internal network, and the fourth step is a step of requesting IoC information to a P2P socket communication module of the other user terminal through UDP broadcasting, which is performed by the P2P socket communication module of the user terminal.

BRIEF DESCRIPTION OF DRAWINGS

FIG. 4 is a view showing an example of IoC information including hash information.

FIG. 5 is a view showing an example of IoC information including IP information.

DETAILED DESCRIPTION OF EMBODIMENTS

Encryption and decryption may be applied, as needed, to the process of transmitting and receiving information (data) performed in this specification, and it should be interpreted that the expressions describing the process of transmitting information (data) in this specification and the claims also include a case of encrypting and decrypting the information (data) although it is not specially mentioned. In this specification, an expression such as "A transmits (transfers) information (data) to B" or "A receives information (data) from B" includes transmitting (transferring) or receiving the information (data) with intervention of another medium therebetween and does not express only directly transmitting (transferring) and receiving the information (data) between A and B. In the description of the present disclosure, the sequence of the steps should be understood as being non-restrictive if a prior step should not be necessarily performed logically or prior to a following step. That is, although a process described as a following step is performed before a process described as a prior step, the essential spirit of the present disclosure is not affected excluding the exceptional case as described above, and the scope of the present disclosure should also be defined regardless of the sequence of the steps. In addition, in this specification, "A or B" should be defined to include both A and B, as well as selectively indicating any one of A and B. In addition, in this specification, the term "comprise" has an inclusive meaning of further including another element, in addition to the written elements.

In this specification, a "module" means a logical combination of general-purpose hardware and software performing its functions.

In this specification, the essential elements of the present disclosure are described, and the elements unrelated to the spirit of the present disclosure will not be mentioned. It should not be interpreted as an exclusive meaning including only the mentioned elements and should be interpreted as a nonexclusive meaning which can exclude nonessential specific elements or include other elements.

The present disclosure is performed by an electronic computing device (also referred to as a "terminal"), such as a computer or the like capable of performing electronic operations. The mathematical operations and calculations of each step of the present disclosure described below may be implemented through a computer operation in a conventional coding method and/or in a coding method devised to be appropriate to the present disclosure.

Figure 1:
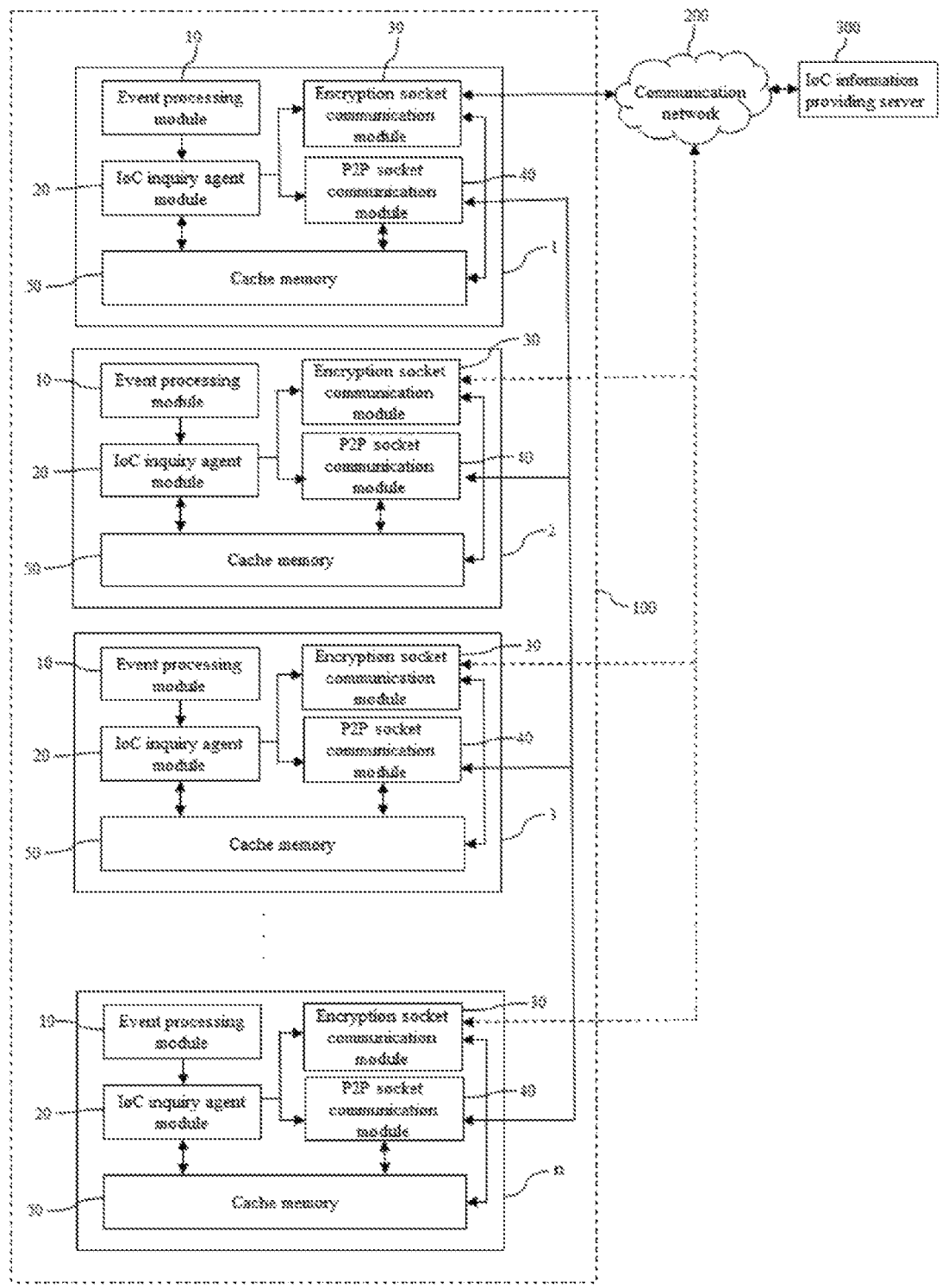
FIG. 1 is a view showing an environment of implementing the present disclosure.

An environment of implementing a method of inquiring and storing IoC information according to the present disclosure is shown in FIG. 1. It is assumed that total n user terminals 1, 2, 3, . . . , n share IoC information, and each of the user terminals comprises an event processing module 10, an IoC inquiry agent module 20, an encryption socket communication module 30, a P2P socket communication module 40 and a cache memory 50. The user terminals 1, 2, 3, . . . , n may perform general data communication with an IoC information providing server 300 through a communication network 200. The general data communication includes a TCP connection, an HTTP connection and SSL encryption communication as described in the above as well as data communication performed through other conventional methods.

Although the user terminals 1, 2, 3, . . . , n may belong to the same local network 100, they may belong to networks different from each other if information can be shared among the user terminals 1, 2, 3, . . . , n through data communication.

If an event for identifying security threat occurs, the event processing module 10 determines a type of information that should be identified. The event may be a confirmation request of a user, a file or process event, a network event or the like. The IoC information that should be identified may include hash information of a malicious code file, IP information, hostname information, URL information, C&C server information and the like.

The IoC inquiry agent module 20 inquires IoC information to the cache memory 50 and requests the encryption socket communication module 30 and the P2P socket communication module 40 to inquire IoC information.

The encryption socket communication module 30 is a module for performing data communication with the IoC information providing server 300 through the communication network 200. Because the specification describes a process of inquiring and acquiring IoC information when an event occurs in the first user terminal 1, the communication of the other user terminals 2, 3, . . . , n through the communication network 200 is shown in dotted lines.

The P2P socket communication module 40 is a module for performing data communication with the other user terminals. For example, a user terminal may perform data communication with the other user terminals in a UDP broadcasting method.

The cache memory is cache memory provided in a general electronic terminal, and IoC information received by each of the user terminals 1, 2, 3, . . . , n may be stored for a predetermined time. Although the cache memory 50 is shown in FIG. 1, the IoC information may be stored in another type of storage medium, not the cache memory, as described below.

Figure 2:
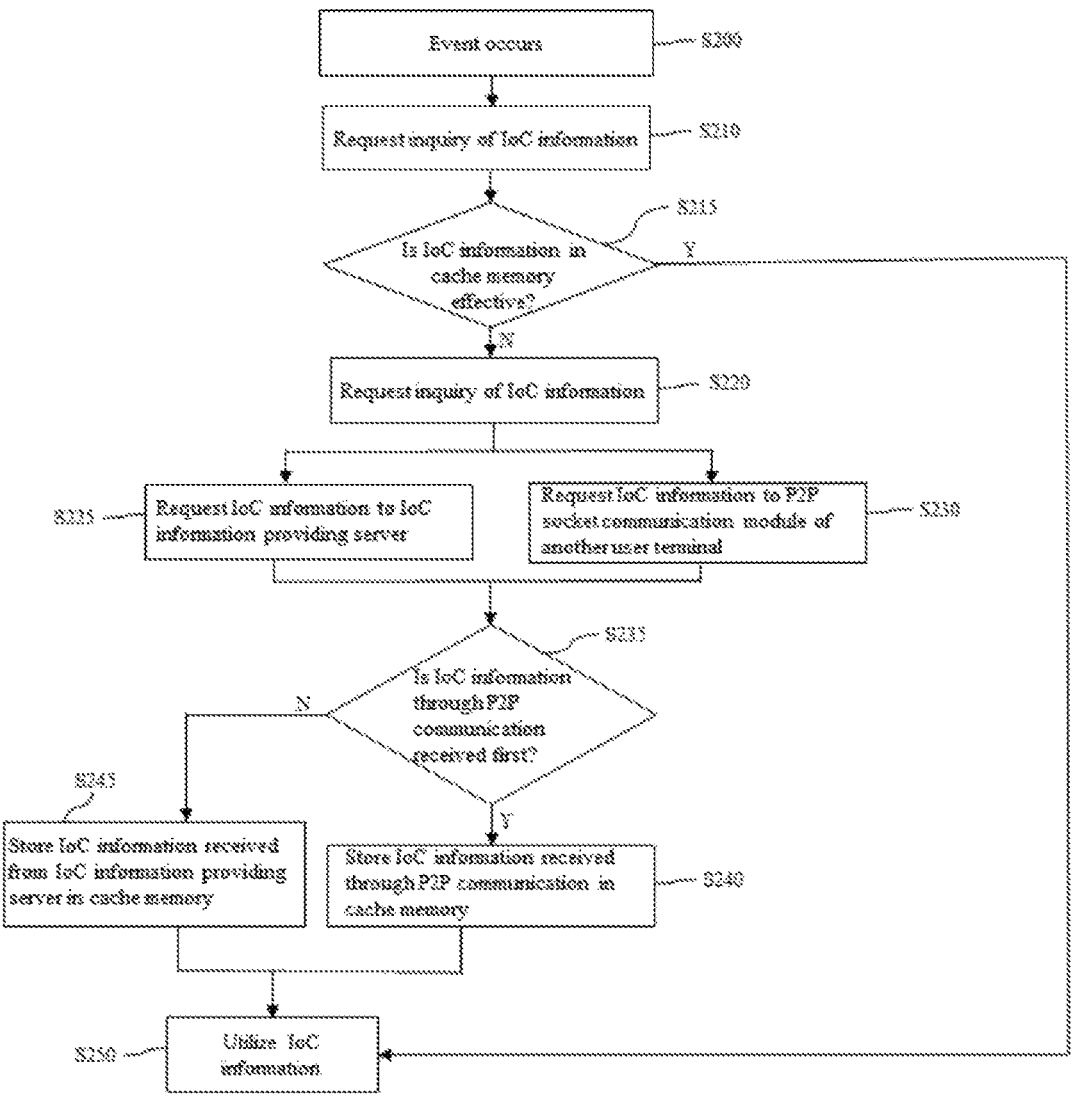
FIG. 2 is a flowchart illustrating a method of inquiring and storing IoC information according to the present disclosure.

A flowchart of a method of inquiring and storing IoC information according to the present disclosure is show in FIG. 2. Although this specification describes a process of receiving IoC information when an event occurs in the first user terminal 1, the process may be applied to the other user terminals 2, 3, . . . , n.

If an event occurs in the first user terminal 1, the event processing module 10 determines the type of IoC information that should be identified (step S200). The event may be a user's request, a file or process event, a network event or the like. The event processing module 10 determines the type of IoC information that should be identified according to the event type. The IoC information may include hash information of a malicious code file, IP information, hostname information, URL information, C&C server information and the like as described above.

If IoC information to be identified is determined, the event processing module 10 inquires whether IoC information is stored in the cache memory 50 (step S210) and determines whether effective IoC information to be identified exists in the cache memory 50 (step S215). If effective IoC information exists in the cache memory 50, step S250 is executed to utilize the stored IoC information. The IoC information is preferably stored in the cache memory 50 for rapid inquiry.

Although an embodiment of storing IoC information in the cache memory 50 will be described below, it does not mean that the IoC information should be stored in the cache memory 50. The IoC information may be stored in another type of storage medium and utilized by a user terminal.

An example of IoC information including hash information (a JASON document type) is shown in FIG. 4, and an example of IoC information including IP information is shown in FIG. 5. The response information to the inquiry of a user terminal 1 (queries) about file hash is shown in FIG. 4, and the response information to the inquiry of a user terminal 1 (queries) about IP is shown in FIG. 5. FIGS. 4 and 5 are only examples, and other types of IoC structures may be used without restriction.

As described below, IoC information received from the other user terminals 2, 3, . . . , n or IoC information received from the IoC information providing server 300 is stored in the cache memory 50 only for a predetermined time period and may be updated after the time is elapsed. It may be programmed to delete the IoC information from the cache memory 50 after the predetermined time is elapsed. Alternatively, it may be programmed to receive new IoC information by making the IoC information stored in the cache memory 50 ineffective after a predetermined time is elapsed. In this specification, it is defined that IoC information stored in the cache memory is not effective if the IoC information is deleted from the cache memory 50 or a predetermined time is elapsed.

If IoC information stored in the cache memory 50 is not effective any more as the IoC information is deleted from the cache memory 50 or a predetermined time is elapsed, the encryption socket communication module 30 and the P2P socket communication module 40 are requested to inquire IoC information (step S220).

Figure 3:
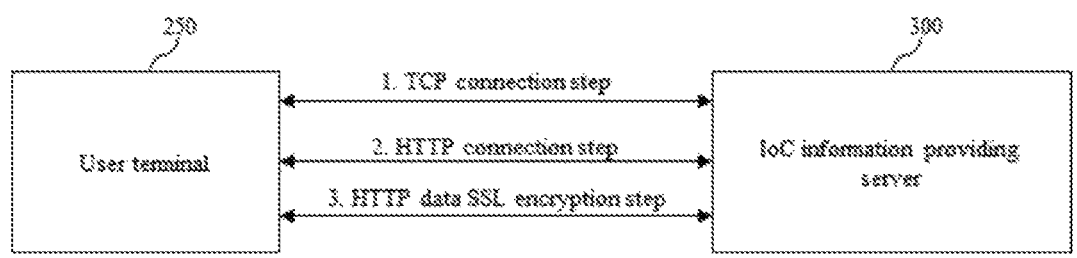
FIG. 3 is a view showing a connection process for acquiring IoC information according to a conventional technique.

If the request is received, the encryption socket communication module 30 connects to the IoC information providing server 300 through the communication network 200 and requests IoC information (step S225). Connection between the IoC information providing server 300 and the encryption socket communication module 30 is performed in the conventional method as shown in FIG. 3 or in another known method. The P2P socket communication module 40 receiving the same request communicates with P2P socket communication modules 40 of other user terminals 2, 3, . . . , n and receives IoC information through P2P communication if effective IoC information is stored in the cache memories 50 of other user terminals 2, 3, . . . , n. If other user terminals 2, 3,...., n belong to the same local network 100, the P2P communication may be performed by a UDP broadcasting method. In this case, the P2P socket communication modules of other user terminals 2, 3, . . . , n are configured to respond to UDP broadcasting.

If IoC information is inquired and received by means of communication between the user terminals by the UDP broadcasting method according to the present disclosure, the problems due to processing load and processing time can be solved.

At step S235, among the IoC information received through the encryption socket communication module 30 and the IoC information received through the P2P socket communication module 40, it is determined which IoC information is received first. If the IoC information received through the P2P socket communication module 40 is received first, the IoC information is stored in the cache memory 50 of the user terminal 1 (step S240), and otherwise, that is, if there is no effective IoC information stored in other user terminals 2, 3, . . . , n, the IoC information received from the IoC information providing server 300 is stored in the cache memory 50 (step S245). The user terminal 1 utilizes the IoC information stored in the cache memory 50 to respond to a security threat (step S250). Because a known security technique may be used as the technique of utilizing the IoC information against security threats and this is not an essential part of the present disclosure, details thereof will be omitted.

Although a method of acquiring and storing IoC information by the first user terminal 1 has been described in the above, other user terminals 2, 3, . . . , n may also acquire and utilize the IoC information in the same method. For example, it is assumed that the first user terminal 1 acquires IoC information by the method as described in the above and stores the IoC information in the cache memory 50 or in another type of storage medium. Thereafter, if an event occurs in another user terminal, e.g., the second user terminal 2, within a predetermined time during which the stored IoC information is effective and the second user terminal 2 desires to acquire IoC information, the second user terminal 2 may communicate with the first user terminal 1 through the P2P socket communication module 40 and inquire and receive IoC information stored in the cache memory 50 or another type of storage medium of the first user terminal (10). The P2P communication may be accomplished by a UDP broadcasting method as described in the above. Because effective IoC information is already stored in the first user terminal 1, it is possible to immediately acquire the IoC information through the P2P communication. Accordingly, the IoC information can be acquired rapidly compared with the conventional technique of acquiring IoC information from the IoC information providing server 300 through the communication network 200, and there is an effect of greatly saving the resources of the IoC information providing server 300.

While the present disclosure has been described with reference to the accompanying drawings, the scope of the present disclosure is defined by the appended claims, and it should not be interpreted as being restricted to the embodiments and/or the drawings described above. It should be clearly understood that improvements, changes and modifications of the present disclosure disclosed in the claims and apparent to those skilled in the art fall within the scope of the present disclosure.

The invention claimed is:

1. A method of inquiring and storing Indicator of Compromise (IoC) information by at least first user terminal among a plurality of user terminals in an environment including the plurality of user terminals, each of the plurality of user terminals having at least an event processing module, an IoC inquiry agent module, an encryption socket communication module, and a P2P socket communication module; and the environment further including an IoC information providing server, the method comprising:

a first step of determining by the event processing module of the first user terminal a target IoC information to be identified when an event occurs based on the event;

a second step of requesting by the IoC inquiry agent module of the first user terminal that the encryption socket communication module and the P2P socket communication module of the first user terminal request the target IoC information;

a third step of requesting by the encription socket communication module of the first user terminal first a IoC information corresponding to the target IoC information from the IoC information providing server;

a fourth step of requesting by the P2P socket communication module of the first user terminal a second IoC information corresponding to the target IoC information from the P2P socket communication module of one or more of the plurality of user terminals other than the first user terminal;

a fifth step of storing by the first user terminal only one of the first IoC information or the second IoC information that is received first from either the IoC information providing server or the P2P socket communication module of one or more of the plurality of user terminal other than the first user terminal, and a sixth step of a user accessing the first user terminal and responding to the event based on the first IoC information or the second IoC information stored on the first user terminal.

2. The method according to claim 1, wherein at the fifth step the first IoC information or the second IoC information is stored in a cache memory of the first user terminal during a predetermined time period, the method further compromising, before the second step, a 2-1 step of analyzing by the IoC inquiry agent module any initial IoC information stored in the cache memory of the first user terminal to determine if the initial IoC information stored in the cache corresponds to the target IoC information, and if the initial IoC information stored in the cache memory does not correspond to the target IoC information, proceeding to the second step.

3. The method according to claim 1, wherein the plurality of user terminals belong to a local internal network; and
wherein the fourth step includes requesting the second IoC information from the P2P socket communication module of one or more of the plurality of user terminals other than the first user terminal through UDP broadcasting by the P2P socket communication module of the first user terminal.

4. The method according to claim 2, wherein the plurality of user terminals belong to a local internal network; and
wherein the fourth step includes requesting the second IoC information from the P2P socket communication module of one or more of the plurality of user terminals other than the first user terminal through UDP broadcasting by the P2P socket communication module of the first user terminal.

5. The method according to claim 1, wherein the fourth step includes establishing a direct connection between the P2P socket communication module of the first user terminal and the P2P socket communication module of the one or more of the plurality of user terminals other than the first user terminal to request the second IoC information.

6. A method of inquiring and storing Indicator of Compromise (IoC) information, comprising:

determining by an event processing module of a first user terminal a desired target IoC information identified based on a security event that occurs on the first user terminal;

requesting by an encryption socket communication module of the first user terminal a first IoC information corresponding to the desired target IoC information from an IoC information providing server;

requesting by a P2P socket communication module of the first user terminal a second IoC information corresponding to the desired target IoC information from a P2P socket communication module of at least one other user terminal in communication with the first user terminal;

storing on the first user terminal only one of the first IoC information or the second IoC information that is received first from either the IoC information providing server or the P2P socket communication module of the at least one other user terminal; and a sixth step of a user accessing the first user terminal and responding to the security event based on the first IoC information or the second IoC information stored on the first user terminal.

7. The method according to claim 6, wherein the first user terminal stores either the first IoC information or the second IoC information in a cache memory of the first user terminal during a predetermined time period.

8. The method according to claim 6, further comprising analyzing by an IoC inquiry agent module on the first user terminal any initial IoC information stored on the first user terminal to determine if the initial IoC information stored on the first user terminal corresponds to the desired target IoC information, and if the initial IoC information does not correspond to the target IoC information, requesting the first IoC information and the second IoC information.

9. The method according to claim 6, further comprising, subsequent to storing the first IoC information or the second IoC information on the first user terminal, deleting the first IoC information or the second IoC information stored on the first user terminal after a predetermined time period.

10. The method according to claim 6, further comprising, subsequent to storing the first IoC information or the second IoC information on the first user terminal, updating the first IoC information or the second IoC information stored on the first user terminal after a predetermined time period.

11. The method according to claim 6, wherein the first user terminal and the at least one other user terminal belong to a local internal network; and
wherein requesting the second IoC information from the P2P socket communication module of the at least one other user terminal includes using UDP broadcasting by the P2P socket communication module of the first user terminal.

* * * * *